Feb. 20, 1951     W. C. GREGORY     2,542,134
COMPOSITE ARTICLE AND METHOD OF MAKING IT
Filed July 26, 1944
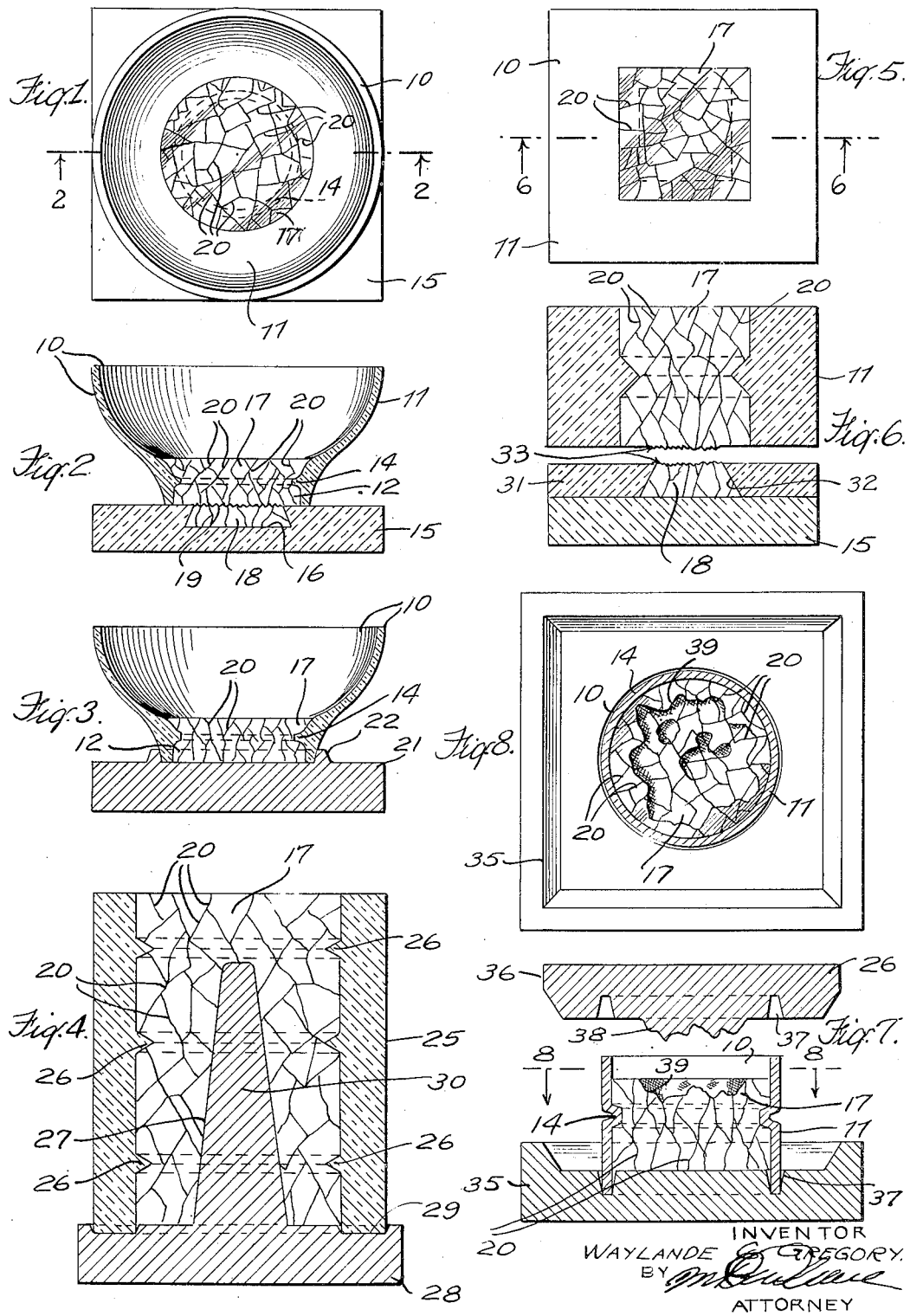
INVENTOR
WAYLANDE C. GREGORY.
BY
ATTORNEY Patented Feb. 20, 1951

2,542,134

UNITED STATES PATENT OFFICE 2,542,134

COMPOSITE ARTICLE AND METHOD OF MAKING IT

Waylande C. Gregory, Bound Brook, N. J.

Application July 26, 1944, Serial No. 546,611

13 Claims. (Cl. 49—92)

This invention relates to composite articles, and in particular to such articles embodying lens-forming areas or portions of glass, of suitable color, provided with internal fractures forming light-reflecting facets or surfaces imparting to the aforesaid areas or portions gem-like or jewel-like properties of great decorative, artistic, and aesthetic value.

It is the object of this invention to provide new and improved articles of the class described wherein the lens-forming internally fractured areas or portions are secured in bases, or frames of suitable material such as ceramic material or metal, providing protection therefor and/or facilitating fabrication of other objects or articles made up of a plurality of such composite articles.

It is a further object of this invention to provide new and improved methods of making the aforesaid articles and in particular to form the aforesaid light transmitting areas or portions of the internally fractured glass therein.

This application is a continuation-in-part of my copending application Serial No. 426,584 filed January 13, 1942 which matured into U. S. Letters Patent No. 2,357,399 granted September 5, 1944.

These and other objects and advantages of the invention will clearly appear from the following description taken with the accompanying drawing and the appended claims.

In the drawing:

Fig. 1 is a top plan view illustrating the making of a composite article, according to this invention, with a frangible member or projection severable to form a light transmitting area or lens;

Fig. 2 is a section taken substantially on the line 2—2 of Fig. 1, cross-hatching being omitted from certain portions of the article in the interest of clearness of disclosure;

Fig. 3 is a view similar to Fig. 2, of a modification thereof;

Fig. 4 is a view, in section, illustrating the formation of a composite article with a hollow space therein for accommodating a source of illumination, or the like;

Fig. 5 is a view, similar to Fig. 1, of another modification wherein a removable ring is utilized in forming the frangible lens-forming projection or member;

Fig. 6 is a section taken substantially on the line 6—6 of Fig. 5 and showing the parts separated, subsequent to severance of the lens-forming projection or member;

Fig. 7 is a view similar to Figs. 2 and 3 but illustrating the formation, in a split or separable mold, of a composite article comprising an annulus into which a body of internally fractured glass is formed, with a decorative or design element at one surface; and Fig. 8 is a plan view, partly in section, of the structure of Fig. 7 as seen from the plane indicated by the line 8—8 of Fig. 7, looking downwardly.

In the embodiment illustrated in Figs. 1 and 2, the composite article comprises a body 10 of ceramic material, for instance, with an annular side wall 11 and a bottom portion having an opening 12 extending therethrough. The wall of the opening 12 is preferably provided with an inwardly directed flange 14 for a purpose which will appear hereinafter.

In forming the above described article, the body 10 is placed upon a ceramic or refractory base 15 having an undercut recess 16 therein, which recess is aligned with the above described opening 12. Thereafter a body 17 of glass is cast in the space formed jointly by the opening 12 and the recess 16. The optional flange 14 enhances the bond between the glass 17 and the body 10 by increasing the bonding area and also provides a mechanical interlock between the glass and the ceramic or refractory material of the body 10.

The undercut recess 16 in the block or base 15 forms a projection 18 weakened at the severing plane 19 along which it may be broken off to provide a clear light transmitting surface whereby the glass body 17 forms, in effect, a light transmitting window or lens between the interior of the body 10 and the rear thereof, the fracture surfaces being clear and needing no grinding or other treatment to allow light to pass therethrough.

While the articles herein described and illustrated embody each but a single lens, as described above, it is of course to be understood that many such lenses may be provided in a single article and the arrangement thereof may be varied, for instance to form the outline of various decorative symbols, initials, figures, etc.

As described in my copending application Serial No. 426,584, filed January 13, 1942 which matured in U. S. Letters Patent No. 2,357,399 granted September 5, 1944, the decorative quality of glass areas of such composite articles may be greatly increased by the provision of internal fractures therein.

These fractures form light reflecting surfaces or facets, generally haphazardly arranged, and reflect light in such manner as to impart a gemlike or jewel-like quality to the glass areas which thus present, generally speaking, life and sparkle to such degree as to suggest sheets of precious jewels bonded to the articles. For this reason, fractures 20 are provided in the interior of the glass 17, and substantially throughout.

The fractures 20 may be formed in the glass body 17 by shrinkage of the glass, on cooling, beyond the shrinkage of the portions of the body 10 bonded or fused thereto as described in the aforesaid application Serial No. 426,584; in such case the projection 18 will be removed or severed from the main body 17 thereafter. Alternatively, the fractures 20 may be formed in the glass 17 by localized thermal shock induced by rapid cooling. For instance the body 10 and glass 17 may be heated several hundred degrees Fahrenheit above normal room temperature, either before or after the projection has been severed, and the whole assembly rapidly cooled or a cooling medium applied to localized portions in order to induce in the glass 17 such internal stresses as will form therein fractures 20 of such size and location as are desired.

The casting of the glass 17 in the body 10 and fusing (i. e., bonding) of the glass to the ceramic body 10 may be accomplished after assemblage of the body 10 and base 15 as shown in Fig. 2, by placing glass, glass forming materials or a mixture thereof in the interior of the body 10 and recess 16 and firing the assemblage, i. e., subjecting the assemblage in a kiln, for instance, to such heat for such time as to fire the ceramic body while melting the glass and fusing it to the ceramic bonding surfaces. Alternatively, the body 10 may be fired or partly fired before introduction of the glass. In such case, the glass may also be introduced in molten condition to the interior of the body 10 and the recess 16 substantially at or above the fusing temperature of the glass.

While the body 10 is illustrated as formed of ceramic material, other suitable materials, suitable for bonding to glass, may be used, as for instance, metal. Where metal is so used, suitable ground coatings or fluxes may be applied to the bonding surfaces to aid in bonding or fusing the glass to these surfaces. Other facet-forming means may also be provided in the glass body as, for instance, metallic flakes, particles or the like suspended therein.

As shown in Fig. 3, the projection 18 may be eliminated, or omitted by substituting for the ceramic or refractory base, block, or base block 15 and its undercut recess 16 a base, base block or plate 21 of metal, optionally provided with means such as 22 for locating and retaining the body 10 in position on the base or plate 21. Where the base block is refractory, the bonding surface or interface will be rough and opaque, requiring further treatment before light can pass therethrough.

In such case, the glass for forming the body 17 is supplied in molten condition to the interior of the body 10 at substantially glass fusing temperature, the base or block 21 being at sufficiently lower temperature to prevent fusing of the glass thereto. If desired the base or block 21 may be provided with suitable means for maintaining its temperature within a desired range, not shown, or the surfaces may be treated to prevent fusing of glass thereto. It is to be noted that the glass forming surface of the plate 21 obviates necessity for polishing or otherwise finishing the rear or lower surface of the glass body 17.

In the embodiment illustrated in Fig. 4, the body 25, corresponding with the above described body 10, is of substantially uniform section from end to end, being provided with a plurality of internal flanges 26 corresponding functionally with the above described flange 14. Though the body 25 is illustrated as formed of ceramic material or the like, it may, of course, be formed of metal as described above.

The base member or base plate 28 is provided with suitable seats 29 engaging the body 25 to retain it in position on the base or plate 28, and a core 30 of suitable form projects upwardly into the interior of the body 25 and into the body 17 of glass bonded therein. The core is illustrated as formed of metal integrally with the base 28 but it may be formed separately therefrom and detachable, if desired. Likewise, in the latter case, it may be made of refractory or other frangible material, formed in the glass body and thereafter removed. The base or plate 28 may also be formed of such materials.

By forming a body 17 of glass on the interior of the body 25 with internal facet forming means such as fractures 20 as described above, with a space such as 27 within the interior of the glass 17, a source of illumination may be inserted in the aforesaid space to produce varied artistic effects as of great masses of jewels of any desired color since the color of the glass may be varied as desired.

As an alternative to the undercut recess 16 provided in the base 15 (Figs. 1 and 2) a removable ring 31 with an undercut central recess 32 may be interposed between the base or plate 15 and the body 10. The ring may be frangible or sectional (and reusable) and like the base 15 and body 10 may be formed of refractory or ceramic or like material, or of metal. As shown in Fig. 6, a weakened section is formed along the plane represented by the line 33 facilitating severance of the projection 18 either prior to removal of the ring 31, as shown in Fig. 6, or thereafter.

As in the embodiment of Fig. 4, the condition in which the glass (i. e., glass forming material) is fused or bonded to the body will depend upon the nature of the body, the base, and the ring or core associated therewith as described above in the description of the embodiments of Figs. 1, 2 and 3.

As shown in Figs. 7 and 8, such composite articles may be formed in split or separable molds or presses of known form. The press shown in Fig. 7 comprises the relatively movable parts 35 and 36 each provided with means such as grooves 37 to retain the body 10 in proper alignment with respect to the parts 35 and 36. These parts are preferably formed of metal, as shown, but as will be readily understood, they may be formed of other materials.

When the parts 35 and 36 are advanced to their ultimate position adjacent one another, the annular wall 11 of the body 10 cooperates therewith to form therewithin a space of predetermined volume. By supplying to the interior of the body 10, as it rests upon the lowermost, supporting part 35 of the press, when the upper most part 36 of the press is withdrawn upwardly, as shown in Fig. 7, a given quantity of molten glass, the press may be closed to form a body 17 of desired thickness.

Optionally suitable means 38 may be provided on one of the press members for molding a suitable design element in a surface of the body 17.

If desired, suitable conventional means may be provided for maintaining the temperature of the parts 35 and 36 of the mold or press within suitable limits for repeated, speed, operation irrespective of the temperatures of the body 10 and the molten glass which temperatures must be maintained rather close together and within relatively narrow limits in order that secure bonding (i. e., fusing of the glass to the internal surfaces of the body 10) may be obtained.

If desired, the body 17 (Figs. 7 and 8) may be formed separately with the groove for receiving the flange 14 of the body 10 molded therein. Thereafter, the flange 14 may be spun into the groove for mechanical attachment of the glass body 17 and the metal body 19 either before or after the facet forming internal fractures are provided in the glass body 17.

In each of the above described articles, the facet forming internal fractures may result from localized thermal shock as described above. This internal fracturing by localized thermal shock is, generally, independent of the bonding area and/or security of fusion between the glass and material of the base. However, in order to secure internal fracturing on cooling by reason of differential shrinkage between the glass and base material, it is necessary that the security and extent of the fusion or bonding be sufficient to permit the cohesion of the glass to be overcome by the stresses induced therein during cooling without substantial damage to, or deterioration of, the adhesion (fusion) between the glass and the base material.

In the following claims, the terms "glass" and "vitreous material" are to be broadly interpreted as including prefired or fritted glass, raw glass, or glass forming materials convertible to molten glass by the heat of fusion or bonding, or mixtures of such fritted glass, raw glass or glass forming materials in any suitable proportions, which mixtures will be converted by the heat of fusion to fusible molten glass. This glass will bond to (i. e., fuse with) the base or frame and thus become so firmly secured thereto, or integrated therewith that internal cracking or fracture of the glass may occur subsequently, by reason of localized application of thermal shock, or by reason of differential shrinkage upon cooling, without destruction of the bond between the glass and the material of the base or base member.

It is of course to be understood that the above description is merely illustrative and in nowise limiting and that I desire to comprehend within this invention such modifications as are included within the scope of the following claims.

Having thus fully described my invention, what I claim as new and desire to secure by Letters Patent is:

1. A composite article comprising a base with an aperture communicating with opposite sides thereof, and a glass body rigidly mounted in said aperture and forming a decorative lens, said glass body having therein haphazardly arranged internal fractures forming individually perceptible light reflecting facets imparting a gem-like quality to the lens formed thereby.

2. The structure defined in claim 1 wherein said base is formed of material capable of having glass fused thereon.

3. A composite article comprising a frame with a space open at opposite sides, and a glass body rigidly mounted in said space and forming a decorative lens, said glass body and the engaging portion of said frame being provided with means forming a mechanical interlock therebetween, and said glass body having therein haphazardly arranged internal fractures forming light reflecting facets imparting a gem-like quality to the lens formed by said glass body.

4. A composite article comprising a base of ceramic material with an aperture communicating with opposite sides thereof, and a glass body having oppositely positioned surfaces, said glass body being rigidly mounted in said aperture and bonded to said ceramic base and forming a decorative lens, said glass body having therein haphazardly arranged internal fractures forming light reflecting facets said fractures extending substantially continuously between said oppositely positioned surfaces, thereby imparting a gem-like quality to the lens formed by said glass body.

5. A composite article comprising a metal frame with an aperture communicating with opposite sides thereof, and a glass body rigidly mounted in said aperture forming a decorative lens, said glass body having therein haphazardly arranged internal fractures extending continuously throughout said body forming light reflecting facets imparting a jewel-like quality to the lens formed thereby.

6. A composite article comprising a base formed of material capable of bonding with glass and with an aperture communicating with opposite sides thereof, a glass body in said aperture integral with said base and forming a decorative lens, and a design element formed adjacent one surface of said lens, said glass body having therein internal fractures forming individually perceptible internal light reflecting facets imparting a gem-like quality to the lens formed by said glass body.

7. A composite article comprising a frame of material capable of bonding with glass and with an opening therein, and a glass body rigidly mounted and bonded by fusing to the sides of said opening and to said frame to form a light transmitting decorative lens, said glass body having therein a space accommodating a source of illumination, said glass body being provided with internal fractures forming internal light reflecting facets imparting a live gem-like appearance to the lens formed by said glass body.

8. The method of forming a composite article embodying a glass lens member provided with internal fractures forming light reflecting facets imparting a jewel-like quality thereto comprising, forming a base capable of being bonded to glass by fusion of the glass and having at least one aperture extending therethrough, forming in said aperture a body of glass with internal fractures therein forming said facets and having a frangible projection extending beyond one side of said aperture, and severing said frangible projection to form a clear surface area at one side of said lens for passage of light therethrough.

9. The method of forming a composite article embodying a glass lens member provided with internal fractures forming light reflecting facets imparting a jewel-like quality thereto comprising, forming a base capable of being bonded with glass by fusion of the glass and having at least one aperture extending therethrough, forming in said aperture a body of glass having a frangible extension projecting beyond one side of said aperture, severing said frangible extension to form a clear surface area at one side of said lens for passage of light therethrough, and thereafter forming said light reflecting facets in said lens.

10. The method defined in claim 8 wherein said base is formed of ceramic material.

11. The method defined in claim 8 wherein said base is formed of metal.

12. The method defined in claim 9 wherein said base is formed of ceramic material.

13. The method defined in claim 9 wherein said base is formed of metal.

WAYLANDE C. GREGORY.

REFERENCES CITED

The following references are of record in the file of this patent:

UNITED STATES PATENTS

| Number | Name | Date |
|---|---|---|
| 250,378 | Meyer | Dec. 6, 1881 |
| 264,657 | Edison | Sept. 19, 1882 |
| 273,371 | Lindsley | Mar. 6, 1883 |
| 385,270 | Jacobs | June 26, 1888 |
| 479,365 | Houghton et al. | July 19, 1892 |
| 1,594,940 | Goodridge | Aug. 3, 1926 |
| 1,603,552 | Middendorf | Oct. 19, 1926 |
| 1,848,312 | Bruzzone | Mar. 8, 1932 |
| 2,017,294 | Branson | Feb. 16, 1937 |
| 2,073,254 | Redman | Mar. 9, 1937 |
| 2,345,278 | Monack | Mar. 28, 1944 |
| 2,357,399 | Gregory | Sept. 5, 1944 |

FOREIGN PATENTS

| Number | Country | Date |
|---|---|---|
| 522 | Great Britain | 1899 |